(12) United States Patent
Amos et al.

(10) Patent No.: US 8,052,155 B2
(45) Date of Patent: Nov. 8, 2011

(54) HIGH TEMPERATURE SEAL AND METHODS OF USE

(75) Inventors: Peter Graham Amos, Essex, CT (US); Ian William Boston, Horgen (CH); Kennet W. Cornett, Ivoryton, CT (US); Jonas Hurter, Baden (CH); Dominick Gregory More, Middletown, CT (US); Markus Stemann, Wettingen (CH); Alexander Zagorskiy, Ennetbaden (CH)

(73) Assignee: ALSTOM Technology Ltd., Baden (CH)

( * ) Notice: Subject to any disclaimer, the term of this patent is extended or adjusted under 35 U.S.C. 154(b) by 350 days.

(21) Appl. No.: 11/278,438

(22) Filed: Apr. 3, 2006

(65) Prior Publication Data

US 2006/0255549 A1 Nov. 16, 2006

Related U.S. Application Data

(63) Continuation of application No. PCT/EP2004/052267, filed on Sep. 22, 2004.

(30) Foreign Application Priority Data

Oct. 2, 2003 (EP) .................................... 03103664

(51) Int. Cl.
*F16J 15/02* (2006.01)
*F16J 15/08* (2006.01)
(52) U.S. Cl. ...................... 277/644; 277/626; 415/173.2
(58) Field of Classification Search .................. 277/644, 277/647, 648, 650, 653–654, 626–627; 415/135, 415/138, 173.3, 173.2
See application file for complete search history.

(56) References Cited

U.S. PATENT DOCUMENTS

| 3,575,432 | A | * | 4/1971 | Taylor | 285/367 |
| 3,761,102 | A | | 9/1973 | Nicholson | |
| 3,975,114 | A | * | 8/1976 | Kalkbrenner | 415/210.1 |
| 4,381,869 | A | * | 5/1983 | Abbes et al. | 277/639 |
| 4,854,600 | A | * | 8/1989 | Halling et al. | 277/626 |
| 5,624,227 | A | * | 4/1997 | Farrell | 415/139 |

(Continued)

FOREIGN PATENT DOCUMENTS

EP 1306589 5/2003

(Continued)

OTHER PUBLICATIONS

Search Report for EP Patent App. No. 03103664.3 (Mar. 24, 2004).

(Continued)

*Primary Examiner* — Vishal Patel
(74) *Attorney, Agent, or Firm* — Cermak Nakajima LLP; Adam J. Cermak

(57) ABSTRACT

A seal (1) includes a first component (7) and second component (9), the first component including a first material having a high thermal and oxidation and wear resistance, and the second component (9) including a second material that is different from the first material and has a high spring load maintenance. The seal (1) is applied to a combustion chamber for a gas turbine, where the first component (7) extends between the casing wall of the combustion chamber and adjacent liner segments (4). The spring load of the second component (9) provides a seal also in the case of vibrations in a combustion chamber. The lifetime of the seal (1) is increased due to the individual materials, which are optimally chosen for the functions of high thermal and wear resistance and spring load maintenance respectively. The seal is further applied to the sealing between adjacent stationary blade platforms in gas turbines.

20 Claims, 6 Drawing Sheets

U.S. PATENT DOCUMENTS

| | | | |
|---|---|---|---|
| 6,193,240 B1 | 2/2001 | Johnson et al. | |
| 6,431,825 B1 * | 8/2002 | McLean | 415/135 |
| 7,090,224 B2 * | 8/2006 | Iguchi et al. | 277/603 |

FOREIGN PATENT DOCUMENTS

| | | |
|---|---|---|
| GB | 2303888 | 3/1997 |
| WO | WO2005/033558 | 4/2005 |

OTHER PUBLICATIONS

International Search Report for PCT Patent App. No. PCT/EP2004/052267 (Jan. 12, 2005).

International Preliminary Report on Patentability for PCT Patent App. No. PCT/EP2004/052267 (Dec. 23, 2005).

* cited by examiner

HIGH TEMPERATURE SEAL AND METHODS OF USE

This application is a Continuation of, and claims priority under 35 U.S.C. §120 to, International application number PCT/EP2004/052267, filed Sep. 22, 2004, and claims priority under 35 U.S.C. §119 to European application number 03103664.3, filed Oct. 2, 2003, the entireties of which are incorporated by reference herein.

BACKGROUND OF THE INVENTION

1. Field of the Invention

The invention pertains to a seal with high temperature and high wear resistance and to the particular application of the seal in a combustor for a gas turbine or between blade platforms in a gas turbine.

2. Brief Description of the Related Art

Seals applied in high temperature environments such as in combustors for gas turbines, in industrial gas turbine technology, steam turbine technology, and aerospace technology are required to withstand high temperatures for a given time duration. In many cases, due to vibrations present in such systems, they are also required to provide a seal over a varying distance and a high wear resistance.

A combustor for a gas turbine includes thermal protection liners placed along the inner circumference of the inner wall of the combustor casing. Such a combustor typically has a conical or a cylindrical shape. The liners are arranged in segments along the inner wall. The temperatures within the combustor rise up to 1200 or 1400° C., such that the liner segments and casing wall must be cooled in order to ensure a significant lifetime. A cooling is realized, for example, by the circulation of air that is between the inner casing wall and the liner segments. In order to control the flow of cooling medium and/or limit the volume of necessary cooling medium (because the cooling medium is costly), seals are placed between adjacent liner segments. In a gas turbine for power generation or aircrafts, the cooling medium can be air or steam.

Large vibrations occur in combustors for gas turbines during operation and in particular during operation at low emission levels. For this reason, spring loaded seals are used as they provide a sealing effect over a large range about a nominal distance. In order to withstand the rubbing against adjacent components, they are furthermore provided with a wear resistant coating. The lifetime of such seals is either determined by the lifetime of the coating, which is the time, in which the coating rubs off mechanically or is depleted as a result of other factors such as oxidation and/or corrosion.

A further problem encountered in the design of such seals is the limited time, for which materials maintain a spring load during exposure to elevated temperatures.

In a gas turbine seals are applied between platforms for stationary blades or stator blades in order to seal the hot gas region from cooling regions for the blades. High performance seals are required in order to minimise the cooling fluid volume and to prevent any hot gas from entering the cooling passages. Such seals must withstand the high prevalent temperatures in the gas turbine as well as perform in situations with large vibrations and large thermal expansions of individual components.

EP 1 306 589 discloses an annular high temperature seal intended for resistance to high temperature stress relaxation. It includes one component having either a single layer or a two-layered system, where the two layers extend over the entire length of the seal. The material or materials for this one component are one of solid solution hardened alloys, precipitation hardened metallic alloys, or dispersion hardened alloys.

U.S. Pat. No. 3,761,102 discloses a sealing ring, in particular a gasket or washer, shaped in a "C" in cross-section with a spring member placed between the inner arms of the "C".

SUMMARY OF THE INVENTION

In view of the described background art, an aspect of the present invention includes providing a seal for high temperature and high wear applications having in particular a longer lifetime compared to those described in the state of the art. They are to be particularly suitable for use in gas turbines and combustion chambers for gas turbines.

A seal according to a first exemplary embodiment comprises a first and second component, the first component having an essentially planar shape and the second component comprising two parts, which are each attached to opposite ends of one side of the first component. The first component comprises a first material having a high thermal, oxidation, and wear resistance, and the second component comprises a second material different from the first material and having a high spring load maintenance.

A seal according to a second exemplary embodiment comprises a first and second component, the first component being shaped in an arch with the outer ends of this arch being in sealing contact with component surfaces. The second component comprises one part, the ends of the second component being attached to opposite ends of the inner side of the arched first component. The first component comprises a first material having a high thermal, oxidation, and wear resistance, and the second component comprises a second material different from the first material and having a high spring load maintenance.

A seal according to a third exemplary embodiment comprises a first and second component, the first component having a planar or trough-like shape, and the second component of the seal having an arch shape that is attached to the centre of the first component. (This shape of seal is frequently referred to as a "K-seal".) As in the first and second exemplary embodiments, the first component comprises a first material having a high thermal, oxidation, and wear resistance, and the second component comprises a second material different from the first material and having a high spring load maintenance.

The material of the first component is optimised to withstand a high temperature oxidising environment as well as a high degree of wear. The high wear resistance of the first component allows the use of this component without a wear resistant coating. The lifetime of the seal is therefore a function of the inherent lifetime of that material, and it is no longer dependent on the lifetime of a wear resistant coating or the time, in which it is depleted by mechanical rub-off or other means.

The material of the second component is particularly optimised to maintain a high spring-load over a long time duration. That material does not necessarily have a high wear or thermal resistance. The spring-loaded component allows the use of the seal in an environment exposed to vibrations or other relative movements of adjacent components, with which the seal is in sealing contact.

The lifetime of the seal is increased due to the individual materials, which are optimally chosen for the functions of the individual components of the seal.

In a first embodiment of the invention the first component of the seal comprises a high wear resistant and thermal resistant material and principally a cobalt-nickel alloy that exhibits oxide dispersion strengthening characteristics.

Preferably, the first component is formed of a high temperature oxidation resistant nickel or cobalt-based super alloy, as for example Rene 41™ (UNS N07041: 52.00Ni-11.00Co-19.00Cr-10.00Mo-5.00Fe-0.50Si-0.10Mn-0.12C-1.60Al-3.10Ti-0.006B-0.015S), Haynes 188 (UNS R30188: 22.00Ni-39.00Co-22.00Cr-14.00W-3.00Fe-0.35Si-1.25Mn-0.10C-0.015B-0.070La), Haynes 214 (UNS N07214: 4.5Al-max 0.01B-0.05C-16Cr-3Fe-max 0.5Mn-75Ni-max 0.2Si-0.01Y-max 0.1Zr), Haynes 230 (UNS N06230: 0.3Al-max 0.015B-0.1C-max 5Co-22Cr-max 3Fe-0.02La-0.5Mn-2Mo-57Ni-0.4Si-14W), and Ultimet™ (UNS R31233: 54Coa-26Cr-9Ni-5Mo-3Fe-2W-0.8Mn-0.3Si-0.08N-0.06C, a=balance, available from Haynes Int'l, Kokomo, Ind.). All materials herein are given in wt-%.

In a preferred embodiment of the invention, the second component is formed of a material with high spring load maintenance. Due to the level of forming required to gain such spring load a precipitation-hardened nickel-chromium alloy is most suitable. Preferably, the second component is formed of a nickel super alloy such as Alloy 718/Inconel 718™ (UNS N07718: (0.2-0.8)Al-max 0.006B-max 0.08C-max 1Co-(17-21)Cr-max 0.3Cu-17Fe-max 0.35Mn-(2.8-3.3)Mo-(4.75-5.5)Nb-50-55Ni-max 0.015P-max 0.015S-max 0.35Si-(0.65-1.15)Ti), Waspaloy (UNS N07001: 1.4Al-0.01B-0.05C-13Co-19.5Cr-1Fe-4.3Mo-57Ni-3Ti-0.7Zr), or Rene 41™.

In a preferred embodiment of the invention the spring-loaded component is shaped having one or more convolutions by means of rolling. This applies to the second component having either two parts, where each part has one or more convolutions, or to the second component having one part.

In a first variant the spring-loaded component is shaped in an overextended "u". In a further variant the spring-loaded component is rolled having several curves. In a particular variant, the second component is rolled into three or more convolutions.

In a further preferred embodiment of the invention, the second component consists of two parts, which are each shaped in an overextend "u" or having several convolutions and which are attached to opposite ends on one side of the first component.

In a particular embodiment of the invention, the first component having an essentially planar shape has a slight trough shape that is preferably placed in the center of the essentially planar component. The component's overall shape remains essentially planar (as opposed to having a "bowl shape"). This shape allows thermal expansions of the first component such that the quality of sealing contacts to adjacent components do not diminish.

In a further preferred embodiment of the invention the thickness of the first component is optimally adapted to its function of oxidation resistance and the thickness of the second component is optimally adapted to its function having a spring load. For this the seal comprises an optimal ratio of the thickness of the first component to the thickness of the second component in the range within 0.5 to 5.

In a further preferred embodiment of the invention, the seal comprises one or several openings for a cooling medium to pass through. These are placed, dependent on its use, either on the first component or second component or on both the first and second component. In the case of a convoluted shape of the second component, the openings are arranged on the plane, non-curved portions of the convoluted parts.

A cooling of the seal, the surrounding area, and the adjacent components reduces the thermal load on the seal and further improves the spring load maintenance of the second component. High spring load maintenance and thermal resistance are two characteristics that are difficult to achieve by using only one material. However, as the spring load maintenance is a function of temperature, a reduction of the thermal load increases the ability to maintain a spring over a longer time period.

In the above-mentioned embodiments, a tungsten inert gas weld attaches the first and second components to one another. The superalloy produced by this type of weld exhibits good homogeneous mechanical properties but may be joined by other welding techniques such as laser welding.

A seal embodying principles of the present invention is suitably applied in the combustor of a gas turbine, and in particular between two adjacent liner segments that are arranged parallel to the combustor casing wall to provide thermal protection of the casing wall. The seal is arranged such that the first component extends between two adjacent liner segments and contacting the surfaces of the liner segments, which face the casing wall. The second component is realised having two convoluted parts that are attached to opposing sides of the first component, in particular to the sides that contact the surfaces of the liner segments. The two parts each extend away from the first component and the surface of the liner segments and to the combustor casing wall. The first component and the two parts of the second component form together with the combustor casing wall a space, through which a cooling medium flows by entering through cooling holes arranged in the convoluted parts and exiting through cooling holes in the first component.

A seal embodying principles of the present invention is further suitably applied to a groove in a platform of stationary blades for the sealing of the hot gas space in a gas turbine and the turbine casing, on which the platforms are arranged.

DETAILED DESCRIPTION OF EXEMPLARY EMBODIMENTS

The seal according to the invention is applicable to the sealing between any two components, where one of the component is exposed to high temperatures, for example up to 1400° C. in a combustor for a gas turbine. Other applications of this seal are in the space industry, for example for nozzle seals.

Figure 1:
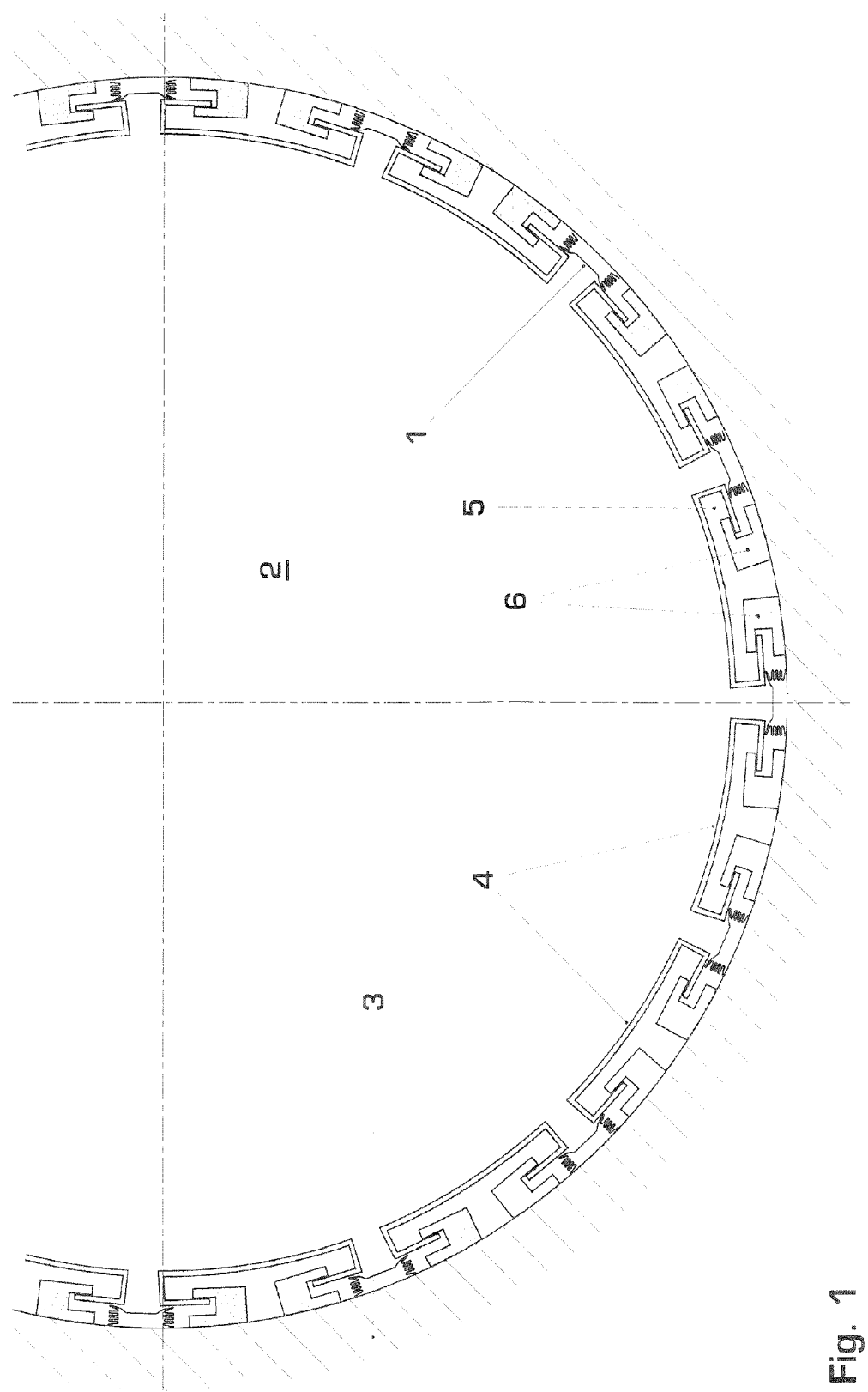
FIG. 1 shows a cross-section of a gas turbine combustion chamber and liner segments arranged around the inner circumference of the chamber wall.

A cross-section of a specific embodiment of the invention is shown in FIG. 1. The seal 1 according to the invention is applied to a combustor of a gas turbine. A combustor casing wall 3 having a circular cross-section encloses the combustor chamber 2. The combustor casing wall 3 is lined with a series of circumferentially arranged liner segments 4, which protect the combustor casing wall 3 from the high temperatures of the gas in the combustor chamber 2. Temperatures reach up to 1400° C.

(The seal is equally applicable to combustors having other shapes, for example annular shapes.)

The liner segments 4 have a slightly curved shape in accordance with the curvature of the combustor casing wall. In order to facilitate an attachment to the combustor wall, each segment 4 is shaped along each of its sides such that it provides a groove on the side facing the wall 3. Clamp strips 6 are arranged in each of the grooves and are attached to the liner segment to the combustor wall 3 by means of bolts 20.

The liner segments 4 are manufactured of a thermally resistant material in order to protect the combustion chamber wall 3. For further thermal protection, the combustion chamber wall is additionally cooled by a cooling medium such as air or steam, which is drawn from the compressor and/or is externally fed and is led between the combustion chamber wall 3 and the liner segments 4. In order to prevent high temperature gases from reaching the combustion chamber wall through gaps of a given width between adjacent liner segments, seals 1 are arranged between adjacent liner segments 4 and extend (in a direction out of the plane of the figure) over a certain length along the length of the combustion chamber. The seals 1 further controls the flow and volume of cooling fluid in view of minimising the volume of fluid necessary for the cooling.

Figure 2:
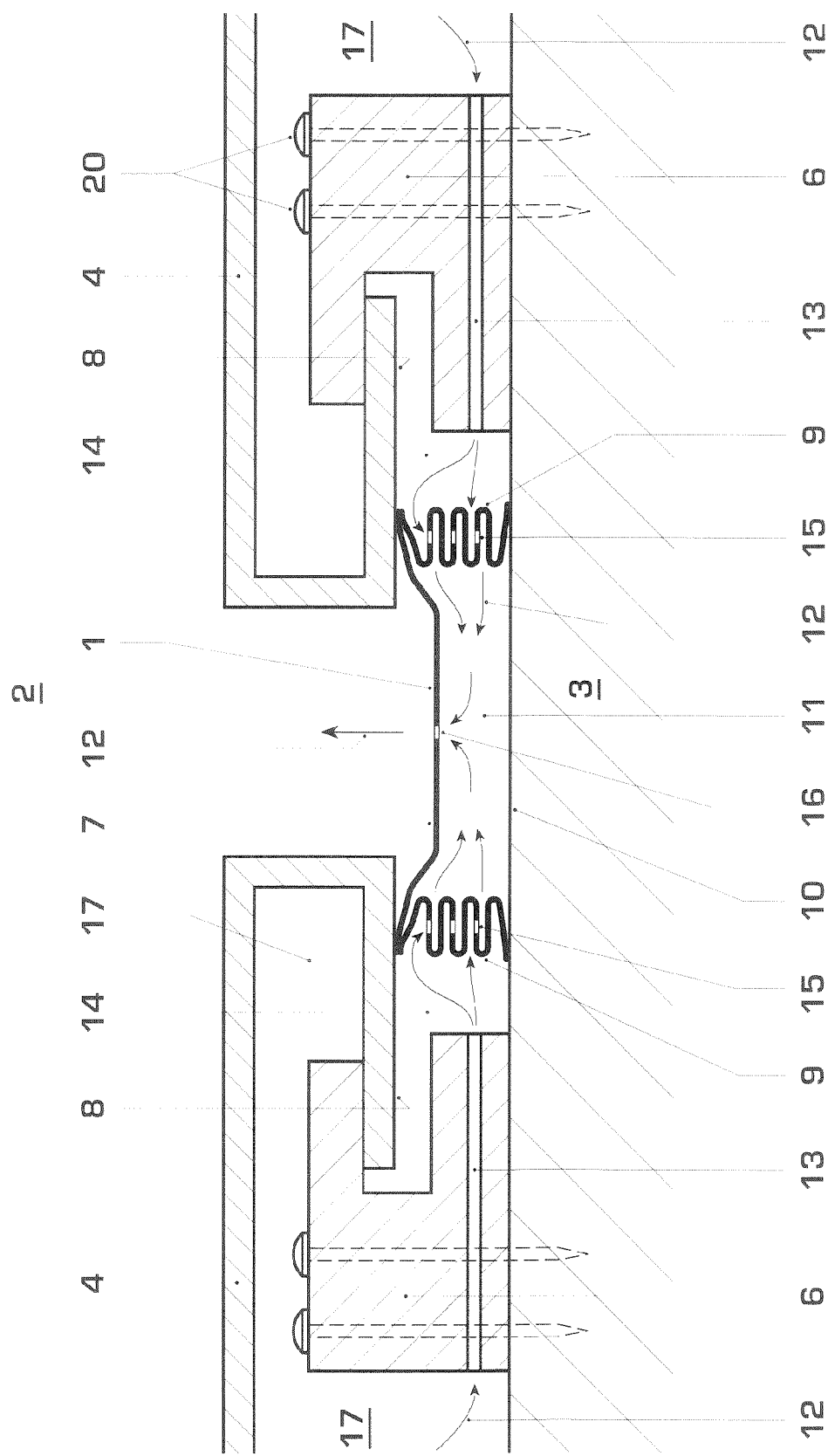
FIG. 2 shows a detailed view of two adjacent liner segments with a seal according to invention arranged between the two liner segments.

FIG. 2 shows a seal 1 placed between the adjacent liner segments 4 in enlarged detail. The centre portion 7 or first component of the seal is in contact with the surface 8 of the liner segments 4, which face the combustor casing wall 3. The two parts of the seal's second component, the spring loaded portions 9, are in contact with the surface 10 of the combustor casing wall 3. The spring loaded portions 9 provide a sealing contact against the surfaces 8 and 10 of the liner segment 4 and the casing wall 3 respectively such that a sealed space 11 is formed between the seal 1 and the combustor casing wall 3. Cooling air drawn from a compressor is led in the direction of the arrows 12 from a space 17 between the liner segments 4 and the combustor casing wall 3 through channels 13 leading through the clamp strips 6. (Clamp strips 6 are fastened to the combustor wall 3 by means of bolts 20). The cooling air reaches via the channels 13 to a space 14 between the clamp strips 6 and the spring loaded portions 9 of the seal 1. From there, it passes through cooling holes 15 placed in the plain sections of the convoluted spring loaded portions 9 and reaches into a space 11 within the seal, convectively cools the seal from within and finally exits through purge holes 16 in the centre portion of the seal 1 into the combustion chamber 2.

The materials for the liner segment are chosen to withstand the typical temperature of up to 1400° C. within the combustion chamber 2. The centre portion 7 of the seal 1 is exposed to a temperature approximately 1100° C. The spring loaded portions 9 of the seal are exposed to lesser temperatures due to the heat shield effect that the seal creates for itself separating the hot gas and the cooling fluid. The temperature within the space 11 is in the range of 400 to 600° C. In the space 17 between combustion chamber wall 3 and liner segment 4, the temperature may be approximately 550° C. Due to a pressure difference, cooling air does not reach from space 14 to space 17.

The seal's main function is to prevent air from reaching from space 14 directly into the combustion chamber 2 and to pass into space 11 instead. Thereby the necessary volume of air for the cooling is reduced. This sealing is particularly difficult in case of vibrations in the combustion chamber at certain operating points of the combustor. The nominal distance between combustion chamber wall 10 and the surfaces 8 of the liner segments is in the range of several millimetres. Movements due to low cycle fatigue can cause variations of 25% of the nominal distance, whereas movements due to vibrations can cause further variation of up to 7% of the nominal distance. Hence, it is important that the spring loaded portions 9 have an optimal ability to maintain their spring load throughout an extended time at the temperatures that they are exposed to. The centre portion 7 on the other hand, must have a high thermal resistance as well as a high wear resistance as the vibrations cause extensive wear at the sealing points against the surfaces 8 of the liner segments 4. For these reasons, the spring loaded portions are manufactured of a material having a high spring load maintenance at temperatures up to approximately 630° C. The centre portion 7 is manufactured of a highly thermally resistant material as well as wear resistant material but does not necessarily provide a high maintenance of spring load.

Preferably, the centre portion 7 is manufactured of a cobalt-nickel alloy such as Ultimet™. Further possible materials are a version of Haynes 25 (UNS R30605: 51Co$^a$-20Cr-15W-10Ni-1.5Mn-0.10C-3Fe(max)-0.4Si(max); a=balance), PM1000™ (DIN (Deutsche Industrienorm) 2.4869: 0.3Al-20Cr-3Fe(max)-(75.6-78.6)Ni-0.5Ti-0.6Y2O3), PM2000™ (DIN 1.4768: 5.5Al-19Cr-74.5Fe-0.5Ti-0.5Y2O3), PK33™ (BS (British Standard) DTD 5057: (1.7-2.5)Al-max 0.005B-max 0.07C-(12-16)Co-16-20Cr-max 0.2Cu-max 1Fe-max 0.5Mn-(5-9)Mo-54Ni-max 0.015X-max 0.5Si-(1.5-3)Ti-max 0.06Zr), Rene 41™.

As this material is superior in terms of wear resistance as well as thermal and oxidation resistance, no protective coating on the first component is necessary.

The spring loaded portions 9 are preferably manufactured of Inconel 718 or nickel-chromium alloys known for their superior spring load maintenance up to temperatures of 630° C.

As an option, the first component may be coated with a wear resistant coating in order to further increase its lifetime.

As a further option, the first component of the seal may also be coated with an oxidation resistant coating to further increase its resistance against oxidising media in the combustion chamber.

Figure 3:
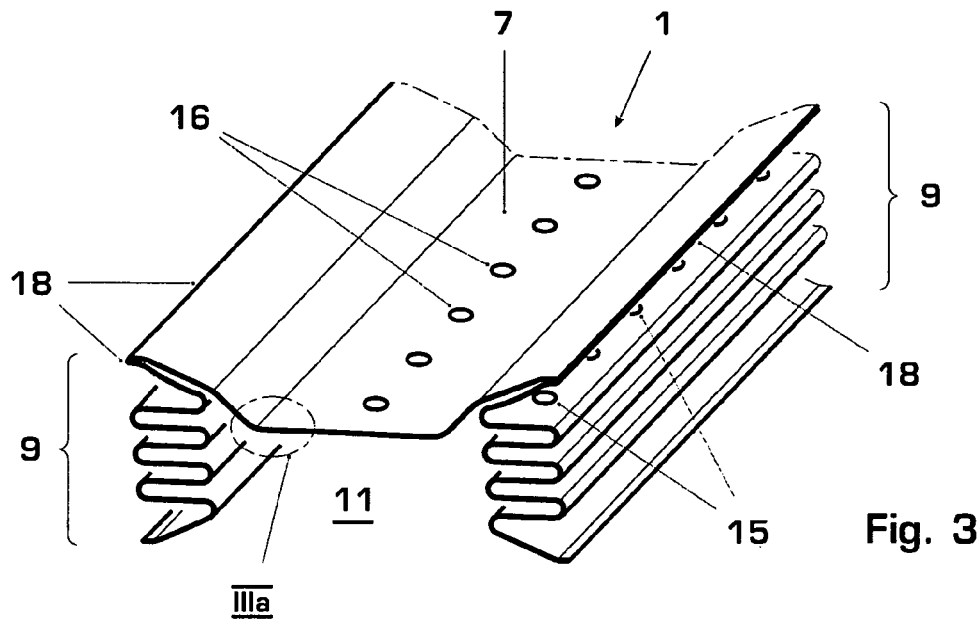
FIG. 3 shows a perspective view of the seal according to the invention of FIGS. 1 and 2.

FIG. 3 shows a section of the seal 1 according to the invention. It may extend along the length of a combustion chamber wall. The first or centre portion 7 of the seal is shaped in its cross-section similar to an angled trough that is symmetrical along its midline running parallel to the line of contact with the two parts 9 of the second component of the seal. This shape has the advantage that it allows a deformation due to vibrations or thermal expansions of the seal and/or the surrounding components contacting the seal. Alternatively, the trough shape may also be curved. In a variant, the centre portion may also, for example, be of a plain flat shape, should potential changes of dimensions and vibrations be less severe. The centre portion 7 has a series of purge holes 16 along its midline for the cooling air to pass exit to the combustion chamber 2.

The convoluted, spring loaded portions 9 have three or more convolutions, and the cooling holes 15 are suitably placed on the plain sections of the convolutions, which are mechanically not loaded.

The two different materials of the first portion 7 and the spring loaded portions 9 are attached by means of a pulsed tungsten inert gas (TIG) weld 18. This type of weld produces a super alloy that is particularly suitable for this application as a transition metal between Ultimet and Inconel 718. The placement of the weld 18 along the two sides of the seal has the advantage that it is exposed to a temperature that is lower compared to the temperature at the midline of the centre portion 7. Therefore, the weld is exposed to smaller forces caused by thermal expansions.

Alternatively, the first and second components of the seal may be attached to one another by means of a laser weld.

Figure 4:
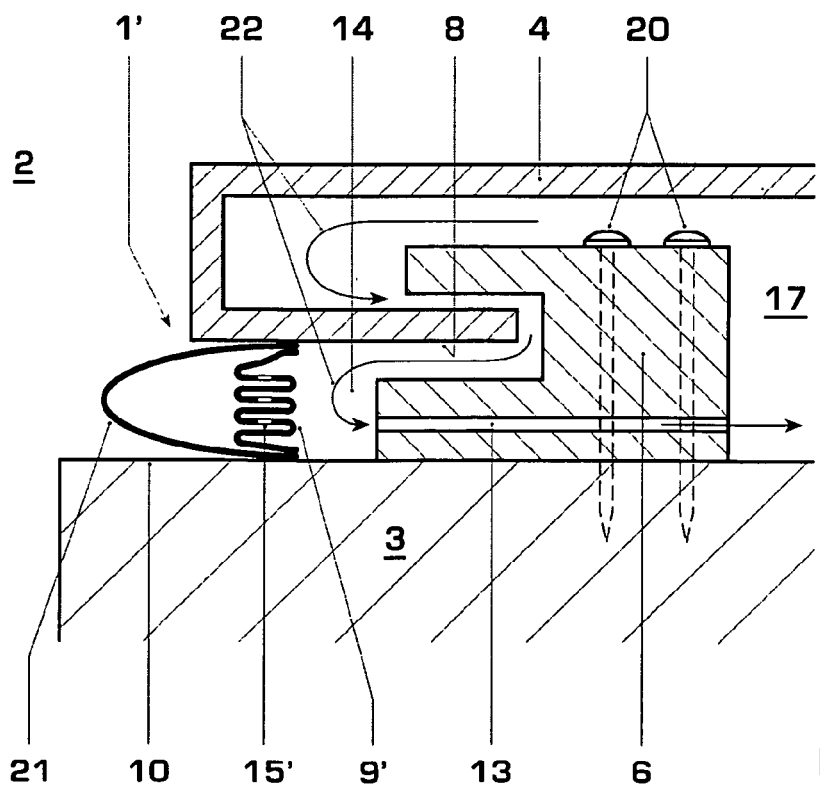
FIG. 4 shows a further seal according to the invention having an arch shaped first component and a second component extending between the inner ends of the arch.

FIG. 4 shows a cross-section of a combustor liner segment 4 of same type as shown in FIG. 1, which are arranged along the inner circumference of a combustor casing wall. It is fastened to the combustor chamber wall 3 with clamp strips 6. FIG. 4 shows a liner segment 4 particularly positioned at the axial end of a combustor split line. A seal 1' is placed between a surface 8 of the liner segment 4 and the surface 10 of the combustor wall 3. Seal 1 has the primary function of separating a space 2 in the combustor chamber comprising the hot gas from a cooling fluid that flows in the direction of the arrows 22 between the liner segment 4 and through a channel 13 passing through clamp strip 6. The seal 1' includes a first component 21 that is realised in the shape of an arch and a second component 9 having a spring load. The outer ends of the arch shaped component 21 are in contact with the surfaces 8 and 10, and the spring loaded component 9' extends between the inner ends of the arch of component 21. The spring loaded component 9' includes three convolutions, similar to the spring loaded component 9 of the seal 1 of FIGS. 1 to 3. The spring load of the second component 9' provides a good pre-load contact for sealing between the first component 21 and the surfaces 8 and 10 of the liner segment 4 and the combustor wall 10 respectively. The spring element may contain cooling purge holes 15, which are suitably placed on the plain sections of the convolutions, which are mechanically not loaded for greater cooling flow. The sealing contact is also especially provided in the case of a varying distance between the two surfaces 8 and 10 due to vibrations and low cycle fatigue movement. The first component 21 is fabricated of a material with a high thermal, oxidation, and wear resistance, and the second component 9' is fabricated of a material having a high spring load maintenance, the suitable materials being the same as those described in connection with the components 7 and 9 of the seal 1 of FIGS. 1 to 3.

Figure 5:
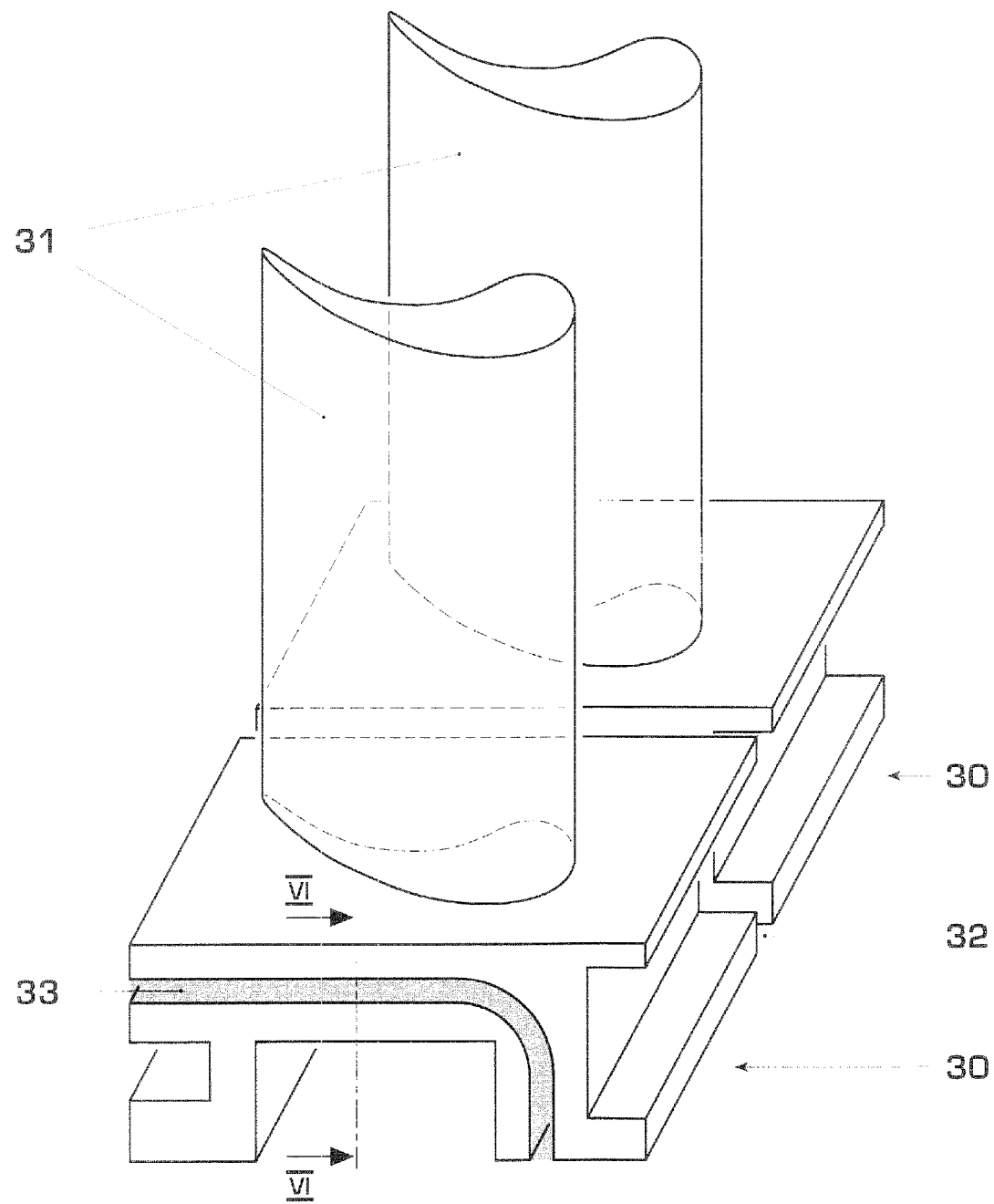
FIG. 5 shows stationary blade platforms for the application of the seal according to the invention in a groove.

FIG. 5 shows two platforms 30 for stationary blades arranged in a blade row on a turbine casing (not shown) with stationary blades 31. The blade platforms 30 are separated by a small gap 32, through which hot gas could flow unless impeded. The blade platforms 30 each include on their endfaces, facing the adjacent blade platform, a groove 33 extending over the greater portion of the endface length and, in this case, extending along a curved portion.

Figure 6A:
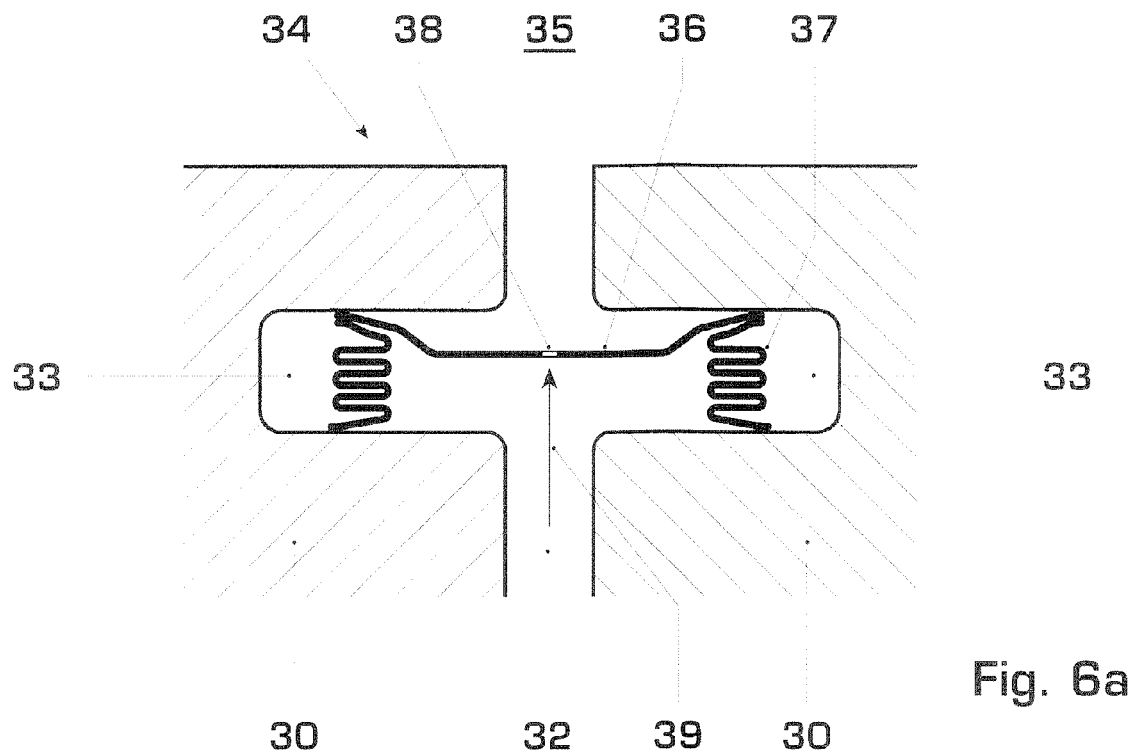
FIGS. 6a and 6b show first and second variants respectively of the seal according to the invention applied to the groove in gas turbine blade platforms.

FIG. 6a shows a cross-section of the platforms along line IV-IV in FIG. 5 and in particular the grooves 33 of each of the adjacent platforms 30 facing one another. A seal 34 according to the invention is placed in the grooves 33 and extends across the gap 32 and thus sealing the hot gas space 35 of the turbine from the casing on the other side of the seal 34. The seal 34 is constructed in a first variant in similar manner as the seal of FIG. 2, having an essentially planar first component 36 and a second component 37 having several convolutions. The first component 36 includes cooling holes 38 for a cooling flow 39 to pass through.

Figure 6B:
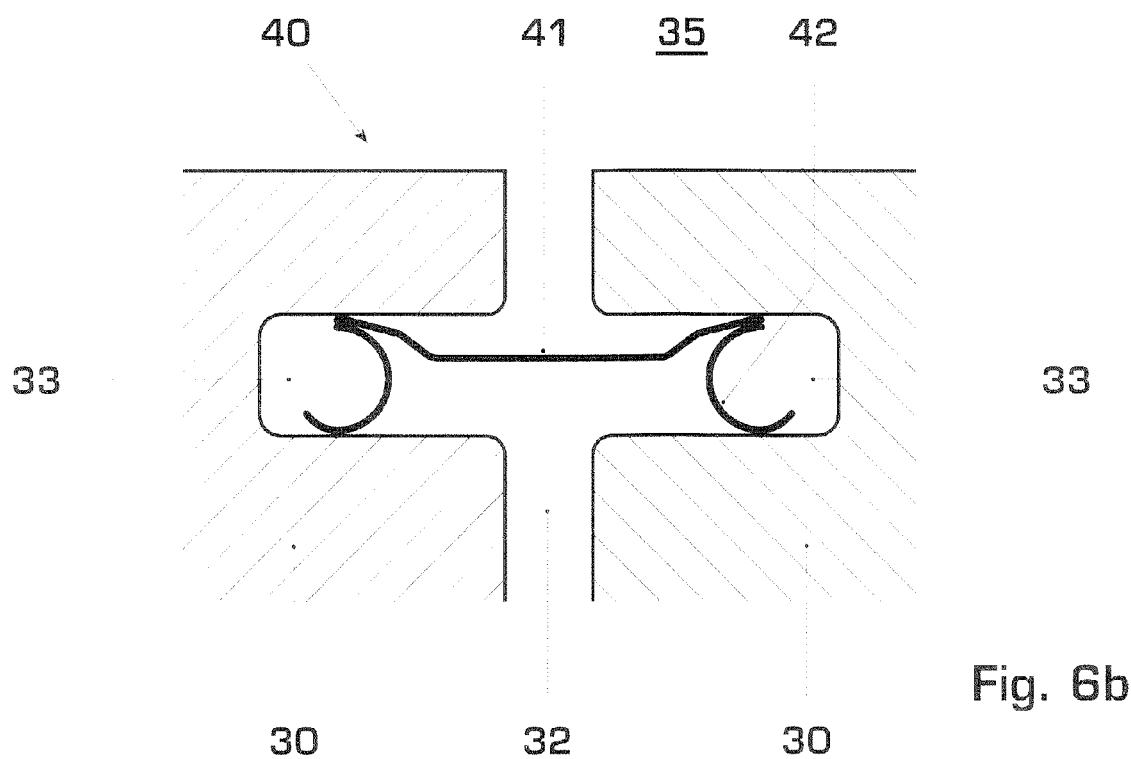

FIG. 6b shows a second variant of the seal 40 placed in grooves 33 of blade platforms 30. The first component 41 is shaped in similar manner as in FIG. 6a, while the second component 42 includes only one convolution forming an overextended "u"-shape. This variant contains no cooling holes.

In principle, all seals shown contain cooling holes or no cooling holes according to their placement within the turbine and the cooling needs of that position.

Figure 3A:
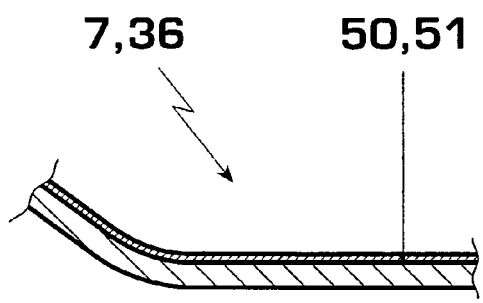
FIG. 3a illustrates an enlarged end view of the embodiment illustrated in FIG. 3, at detail IIIa.

With reference to FIG. 3a, as an option, for all the seals disclosed, the first component may be coated with a wear resistant coating 50 in order to further increase its lifetime.

As a further option, the first component of the seals may also be coated with an oxidation resistant coating 51 to further increase its resistance against oxidising media in the combustion chamber or in the gas turbine.

While the invention has been described in detail with reference to exemplary embodiments thereof, it will be apparent to one skilled in the art that various changes can be made, and equivalents employed, without departing from the scope of the invention. The foregoing description of exemplary embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A seal comprising:
    a first component having first and second opposite ends;
    a second component attached to the first component;
    wherein the first component comprises a planar shape having a first planar side, a second planar side opposite said first planar side, and the first component comprises a first material of high thermal, oxidation, and wear resistance;
    wherein the second component comprises a second material different from the first material and has a high spring load maintenance;
    wherein the second component comprises first and second separate serpentine parts;
    wherein the second component first part is attached at the first component first end on said first planar side, and the second component first part extends away from the planar component first end; and
    wherein the second component second part is attached at the first component second end on said first planar side, and the second component second part extends away from the planar component second end.

2. A seal according to claim 1, wherein the first and second components are configured and arranged such that, when the first and second components are positioned between two liner segments and a casing wall of a gas turbine, the first and second components seal between the two liner segments and the casing wall.

3. A seal according to claim 1, wherein each of the two separate serpentine parts of the second component comprises planar regions and cooling holes arranged in said planar regions.

4. A seal according to claim 1, wherein the first component comprises an alloy having a composition of 26Cr-9Ni-5Mo-3Fe-2W-0.8Mn-0.3Si-0.08N-0.06C-balance Co, or a nickelor cobalt-based superalloy, and the second component comprises a precipitation-hardened nickel-chromium alloy.

5. A seal according to claim 1, wherein the first material comprises a cobalt-nickel alloy.

6. A seal according to claim 1, wherein the first material comprises an alloy having a composition of 26Cr-9Ni-5Mo-3Fe-2W-0.8Mn-0.3Si-0.08N-0.06C-balance Co.

7. A seal according to claim 1, wherein the first material comprises a nickel- or cobalt-based super alloy.

8. A seal according to claim 1, wherein the second material comprises a precipitation-hardened nickel-chromium alloy.

9. A seal according to claim 8, wherein the second material comprises (0.2-0.8)Al-max 0.006B-max 0.08C-max 1Co-(17-21)Cr-max 0.3Cu-17Fe-max 0.35Mn-(2.8-3.3)Mo-(4.75-5.5)Nb-50-55Ni-max 0.015P-max 0.015S-max 0.35Si-(0.65-1.15)Ti.

10. A seal according to claim 1, wherein the second component comprises at least three convolutions.

11. A seal according to claim 1, wherein a ratio of a thickness of the first component to a thickness of the second component is in a range between 0.5 and 5.

12. A seal according to claim 1, wherein the first component or both the first component and second component each comprise several cooling holes.

13. A seal according to claim 1, wherein the second component comprises planar regions and cooling holes arranged in the planar regions.

14. A seal according to claim 1, wherein the first component has a symmetrical cross-sectional shape.

15. A seal according to claim 1, wherein the first component comprises a center trough.

16. A seal according to claim 1, further comprising:
a tungsten inert gas weld attaching the second component to the first component.

17. A seal according to claim 1, further comprising:
a laser weld attaching the second component to the first component.

18. A seal according to claim 1, wherein the first component comprises a wear resistant coating.

19. A seal according to claim 1, wherein the first component comprises an oxidation resistant coating.

20. A seal according to claim 7, wherein the first material nickel- or cobalt-based super alloy comprises a material selected from the group consisting of
52.00Ni-11.00Co-19.00Cr-10.00Mo-5.00Fe-0.50Si-0.10Mn-0.12C-1.60Al-3.10Ti-0.006B-0.015S,
22.00Ni-39.00Co-22.00Cr-14.00W-3.00Fe-0.35Si-1.25Mn-0.10C-0.015B-0.070La,
4.5Al-max 0.01B-0.05C-16Cr-3Fe-max 0.5Mn-75Ni-max 0.2Si-0.01Y-max 0.1Zr,
0.3Al-max 0.015B-0.1C-max 5Co-22Cr-max 3Fe-0.02La-0.5Mn-2Mo-57Ni-0.4Si-14W, and
26Cr-9Ni-5Mo-3Fe-2W-0.8Mn-0.3Si-0.08N-0.06C-balance CO.

* * * * *